Jan. 28, 1930.                F. A. OST                1,745,115
                            CUTTING TORCH
                         Filed June 7, 1928
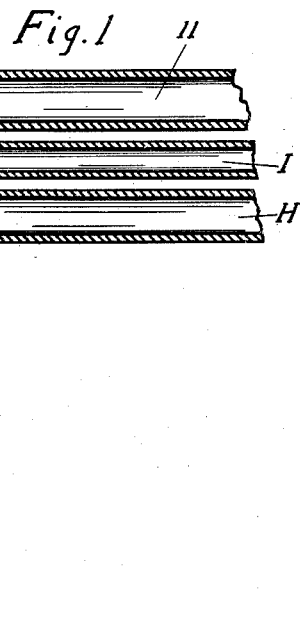
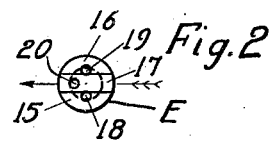
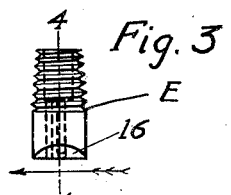
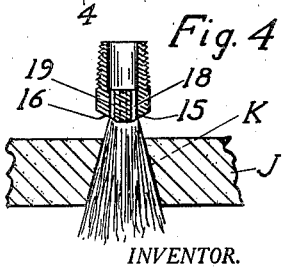
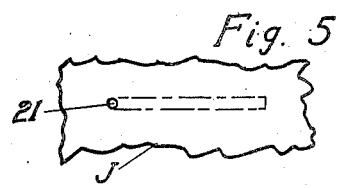
INVENTOR.
Frederick A. Ost
BY
ATTORNEYS.

Patented Jan. 28, 1930

1,745,115

UNITED STATES PATENT OFFICE

FREDERICK A. OST, OF INGLEWOOD, CALIFORNIA, ASSIGNOR TO EDWARD M. SMITH, OF LOS ANGELES, CALIFORNIA

CUTTING TORCH

Application filed June 7, 1928. Serial No. 283,717.

It is customary to use slotted pipe as a strainer in the bottom of oil and other wells and it is an advantage to keystone or diverge the walls of the slot inwardly so as to produce clearance for any particles of sand and other material that might enter and tend to clog the slot. Particularly is this necessary when the wall of the pipe or other material is thick. This invention relates to an improved burner tip for cutting torches which is adapted to cut slots quickly with inwardly diverging smooth side and end walls and with smooth edges, in pipe and through sheets of thick material. The slots which are cut are accurate and regular in shape and free from ragged edges and the tip and tip end of the burner are simple and inexpensive and not liable to disorder. The character of the burner tip end also enables the cutting torch to be used without tilting after it has been set for cutting a slot and also causes the cutting stream or jets of oxygen to burn or melt away all of the material in the slot without forming a core which is an advantage. The burner constructed in accordance with my improvement is particularly although not exclusively adapted for machine use where a number of burners are employed for effectively cutting a large number of slots simultaneously.

In the accompanying drawing forming part of this specification, Fig. 1 is a vertical section of a cutting torch provided with my improved burner tip; Fig. 2 is a bottom plan view of the burner tip removed from the torch, shown in Fig. 1; Fig. 3 is a side elevation of the burner tip removed from the torch; Fig. 4 is a vertical section taken on the line 4—4 of Fig. 3, illustrating the jets of oxygen issuing from the burner tip, in the act of cutting a slot through a piece of material; and Fig. 5 is a plan of a piece of pipe or other material showing a starting hole therein preparatory to the use of the cutting torch for cutting a slot, said slot being indicated by broken lines.

Referring to Fig. 1, A is the nozzle of a cutting torch of usual type, which is held seated in a head B, by the threaded nut C. These parts contain suitable ducts for supplying acetylene gas, pre-heating oxygen and cutting oxygen to the work end of said nozzle. D is a central longitudinal duct in the nozzle, communicating with a passage 10, in the head B and thence to a cutting oxygen supply pipe 11. Threaded at 12 in the work end of the nozzle A and connected with said duct D is my improved burner tip E to be hereinafter described. Two longitudinal ducts F and G for conducting a mixture of acetylene gas and oxygen to the work end of the nozzle are provided, the outlets of said ducts being arranged on opposite sides of the burner tip E, outlet F being in advance of outlet G, when the work end of the burner is moved in the direction of the arrow shown in Fig. 1, during the act of using the burner for cutting. The upper ends of ducts F and G communicate through channels 13 and 14 in the nozzle with feed pipes H and I, respectively supplying acetylene gas and pre-heating oxygen to the burner.

My improved burner tip E as shown in Fig. 1 is threaded at 12 upwardly into the duct passage D, in the lower end of nozzle A and projects downwardly a short distance below the lower end of the nozzle. This tip is formed on its lower end with a pair of opposite bevel end faces 15 and 16, leaving a flat end surface 17 disposed at right angles to the axis of the burner tip. Through these three surfaces emerge three jet holes which supply a stream of cutting oxygen on the burner tip adjacent to the pre-heating outlets of ducts F and G. These three jet holes are spaced apart and extend in parallel relation to the axis of the burner tip. Two of the three jet holes 18 and 19 emerge through the bevel end faces 15 and 16, while the remaining hole 20, of the three emerges through the flat end 17 ahead of the pair. The jet of cutting oxygen from hole 20 thus projects in substantially a direct line below the tip ahead of the pair of jet holes 18 and 19, when the burner is moved ahead, in the direction of the arrow shown in Fig. 1, during the cutting operation. Due to the bevels 15 and 16, the jet holes 18 and 19 release the oxygen first at their outer sides thus causing the jets of oxygen issuing therefrom to diverge and cut a slot with diverging sides. As illustrated in Fig. 4, the jets of cutting oxygen are shown issuing from my improved burner tip E and cutting a piece of pipe J or other material inwardly with diverging sides. The rims of the lower ends of the jet holes 18 and 19 are disposed in inclined planes causing the jets of cutting oxygen to spread and produce a slot K having diverging side walls. The leading jet hole 20 in advance of the pair of side jet holes cuts a vertical wall at the end of the slot or it can be inclined to keystone the end. When starting to use the torch for cutting, a small starting vertical end hole 21 is drilled through the pipe material J to admit the jet of oxygen from jet hole 20. The burner is thus adapted to cut quickly through thick metal with smooth and regular diverging surfaces free from rough edges.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention what I claim as new and desire to secure by Letters Patent is:

1. A torch for cutting slots having a cutting tip end with a slanting end through which a cutting jet hole issues at an obtuse angle, whereby the stream of cutting gas issues through said hole earlier on one side than the other to undercut the side of a slot, and a pre-heating jet hole near said cutting jet hole in said tip end.

2. A torch for cutting slots having a cutting tip end with three end surfaces, two of which converge and a pair of oppositely arranged cutting jet holes, one issuing through one converging surface at an obtuse angle and the other hole issuing through the other converging surface at an obtuse angle whereby the streams of cutting gas issuing from said holes spread and are adapted to undercut the sides of a slot, and a pre-heating jet hole emanating through the remaining end surface on said tip end and near said cutting jet holes.

In witness whereof I have signed my name to this specification.

FREDERICK A. OST.